W. Cleveland,
Faucet.
N°30,122.  Patented Sep. 25, 1860.
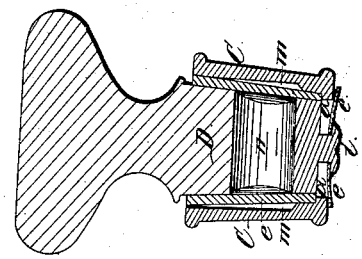
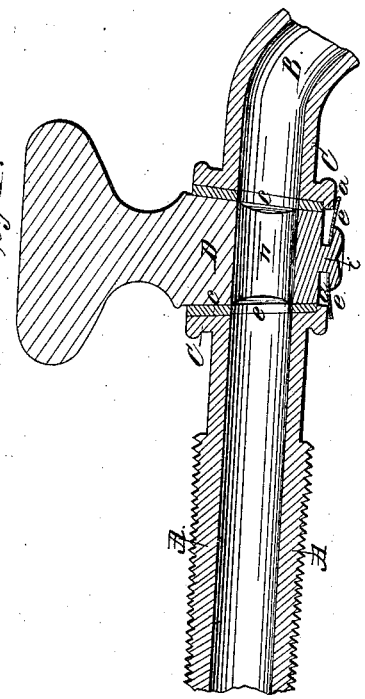
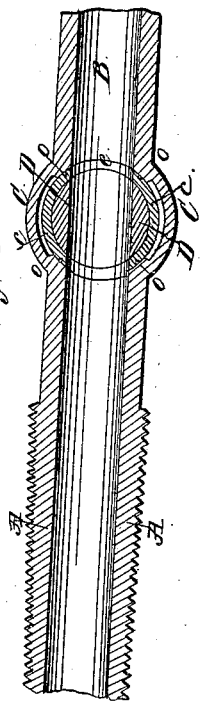
Witnesses:
E. Cohn
J. Hirsch.
Inventor:
William Cleveland
By atty A B Stoughton

UNITED STATES PATENT OFFICE.

WILLIAM CLEVELAND, OF ORANGE, NEW JERSEY.

FAUCET.

Specification of Letters Patent No. 30,122, dated September 25, 1860.

*To all whom it may concern:*

Be it known that I, WILLIAM CLEVELAND, of Orange, in the county of Essex and State of New Jersey, have invented certain new and useful Improvements in Faucets; and I do hereby declare the following to be a full, clear, and exact description of the construction of the same, reference being had to the accompanying drawings, making a part of this specification, in which—

Figure 1, is a longitudinal section through the faucet, with the tap open. Fig. 2, is a transverse section through the body and tap of the faucet, as they appear when closed. Fig. 3, represents a horizontal section through the body and tap of the faucet.

Similar letters of reference where they occur in the several figures denote like parts of the faucet, in all the drawings.

My invention relates mainly to that class of faucets, whose bodies are packed with leather, or other equivalent flexible material, and whether the packing be connected to the body or to the tap; and my invention consists first in the use of a spring washer on the lower end of the tap, for the purpose of keeping the tap tight in the body or bowl of the faucet; second, in making recesses in the opening of the body or bowl of the faucet, at points opposite to the openings of the tap, when the faucet is closed; third, in the ribs or projections on the inside of the body or bowl of the faucet, to hold the leather, or other flexible packing in place. The particular object and advantage of these several improvements on the faucet, will be fully described in connection with the drawings, so that any one skilled in the art will fully comprehend their construction, operation and action.

A, represents that part of the pipe or tube of the faucet which is fastened to the cask or other thing from which liquids or fluids are to be drawn or taken; and B, is the exit end of the pipe, which may be curved around as shown in Fig. 1.

C, is the body or bowl of the faucet, made slightly conical, so as to receive a conical tap D, in its opening. At the lower end of the body of the faucet there may be a flange a, against which the lower end of the packing c, may rest. This packing I prefer to make of leather, but of course know that other flexible substances may be used, as cork, rubber, prepared cloth, &c., and do not therefore confine myself to the use of leather.

The tap D, is made shorter than the body C, of the faucet, and when it is in its place, it is held there by an elastic washer e, that is riveted, or burnished to a projecting stem i, on the tap, and constantly tends to draw the tap down closely to its seat, thus compensating for any wear on the tap or packing. The washer e I prefer to make of rolled sheet brass, but other suitably elastic metal may be used in the place of the brass, or hard rubber may be used.

When the tap is closed as shown in Fig. 2, the opening in the plug or tap (n) is filled with the liquid, and this liquid lying in contact with the leather packing, tends to swell or distend it; and when so swelled or distended, and the tap is turned against it, it moves, crimps, cuts, or wears said packing. To avoid this, I form recesses m, m, in the inside of the body of the faucet, and opposite to where the liquid rests against the packing when the faucet is closed, so that the packing may swell or distend into said recesses, instead of into the openings of the plug or tap, and thus prevent it from being crimped, torn, cut, or needlessly worn away, or forced around with the tap.

If the packing c, rested simply against the smooth metal surface of the body of the faucet, it would be liable to slip, or turn with the tap. To prevent this, I form ribs or projections o, on the inside of the body of the faucet, which embed themselves in the packing, and thus hold it from slipping, or turning.

Should the tap become loose, or the faucet leak, it can be readily tightened by simply tightening up the rivet and washer e.

I thus make an exceedingly cheap and efficient faucet and one of great durability.

The packing instead of being attached to the body of the faucet, may be connected to the tap, but it is better connected with the body. I should however, deem that my invention was involved in either attachment, or whether the packing was stationary or movable, and when a hard rubber washer is used, a smaller metal or other washer may also be used to catch the riveted or burnished portion of the stem.

Having thus fully described the nature and object of my invention what I claim therein as new, and desire to secure by Letters Patent is—

1. In combination with the body and tap of a faucet one of which is packed with suitably flexible material, the elastic washer $e$, for the purpose, and substantially in the manner, described.

2. The recesses $m, m$, in the inside of the body of the faucet, to allow the packing to swell or distend into, and thus prevent it from being injured or misplaced by the turning of the tap, substantially as described.

3. In combination with the packing, the ribs or projections $o$, that embed themselves therein, to prevent said packing from slipping, substantially as described.

WM. CLEVELAND.

Witnesses:
A. H. FREEMAN,
JAMES W. FIELD.